United States Patent
Liao et al.

(10) Patent No.: US 12,243,438 B2
(45) Date of Patent: *Mar. 4, 2025

(54) ENHANCING VIDEO LANGUAGE LEARNING BY PROVIDING CATERED CONTEXT SENSITIVE EXPRESSIONS

(71) Applicant: INTERNATIONAL BUSINESS MACHINES CORPORATION, Armonk, NY (US)

(72) Inventors: I-Hsiang Liao, Taipei (TW); Cheng-Yu Yu, Taipei (TW); Chih-Yuan Lin, New Taipei (TW); Yu-Ning Hsu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,848

(22) Filed: Aug. 16, 2023

(65) Prior Publication Data

US 2023/0401978 A1    Dec. 14, 2023

Related U.S. Application Data

(63) Continuation of application No. 16/178,715, filed on Nov. 2, 2018, now Pat. No. 11,769,425.

(51) Int. Cl.
*G09B 19/06* (2006.01)
*G06F 16/71* (2019.01)
(Continued)

(52) U.S. Cl.
CPC ............. *G09B 19/06* (2013.01); *G06F 16/71* (2019.01); *G06F 16/7844* (2019.01);
(Continued)

(58) Field of Classification Search
CPC ......... G09B 19/06; G09B 5/065; G10L 15/26; G06F 16/7844; G06F 16/71; G06F 40/58; G06F 40/30
See application file for complete search history.

(56) References Cited

U.S. PATENT DOCUMENTS 5,726,107 A * 3/1998 Dahringer ............ D04H 1/4334
  442/364
6,993,535 B2 * 1/2006 Bolle ...................... G06F 16/58
  707/E17.103
(Continued)

FOREIGN PATENT DOCUMENTS

WO    WO2005076243    8/2005
WO    WO20140165970   10/2014

OTHER PUBLICATIONS

List of IBM Patents or Patent Applications Treated as Related dated Aug. 16, 2023, 2 pages.
(Continued)

*Primary Examiner* — Xuan M Thai
*Assistant Examiner* — Sadaruz Zaman
(74) *Attorney, Agent, or Firm* — Tutunjian & Bitetto, P.C.; Yuanmin Cai

(57) ABSTRACT

A computer processing system is provided for enhancing video-based language learning. The system includes a video server for storing videos that use one or more languages to be learned. The system further includes a video metadata database for storing translations of sentences uttered in the videos, character profiles of characters appearing in the videos, and mappings between the sentences and a learner profile. The system also includes a learner profile database for storing learner profiles. The system additionally includes a semantic analyzer and matching engine for finding, for at least a given video and a given learner, alternative sentences for and responsive to the translations of the sentences uttered
(Continued)

in the given video that conflict with a respective learner profile for the given learner. The computer processing system further includes a presentation system for playing back the given video and providing the alternative sentences to the given learner.

20 Claims, 7 Drawing Sheets

(51) Int. Cl.
    *G06F 16/783*     (2019.01)
    *G06F 40/30*     (2020.01)
    *G06F 40/58*     (2020.01)
    *G09B 5/06*     (2006.01)
    *G10L 15/26*     (2006.01)

(52) U.S. Cl.
    CPC ............ *G06F 40/30* (2020.01); *G06F 40/58* (2020.01); *G09B 5/065* (2013.01); *G10L 15/26* (2013.01)

(56) References Cited

U.S. PATENT DOCUMENTS

| | | | | |
|---|---|---|---|---|
| 7,124,149 | B2* | 10/2006 | Smith | G06F 16/7837 707/999.102 |
| 7,996,762 | B2* | 8/2011 | Qi | G06F 16/7847 715/233 |
| 8,086,549 | B2* | 12/2011 | Qi | G06N 20/10 706/14 |
| 8,924,993 | B1* | 12/2014 | Niebles Duque | H04N 21/23418 725/9 |
| 9,262,935 | B2* | 2/2016 | Nielson | G09B 5/00 |
| 9,367,806 | B1* | 6/2016 | Cosic | G06F 3/04842 |
| 9,414,040 | B2* | 8/2016 | Miller | H04N 5/93 |
| 9,653,000 | B2 | 5/2017 | Wee | |
| 9,826,188 | B2* | 11/2017 | Jackson | H04N 21/8456 |
| 10,147,336 | B2* | 12/2018 | Nielson | G06F 40/205 |
| 10,298,895 | B1* | 5/2019 | Ramachandra | H04N 9/43 |
| 10,506,303 | B1* | 12/2019 | Kokku | G06V 20/41 |
| 10,554,931 | B1* | 2/2020 | Zavesky | H04N 7/147 |
| 10,896,620 | B2* | 1/2021 | Nevarez | G06F 40/131 |
| 10,904,616 | B2* | 1/2021 | Vaughn | H04N 21/4394 |
| 10,950,135 | B2* | 3/2021 | Ghatage | G09B 7/02 |
| 10,970,898 | B2* | 4/2021 | Ahuja | G09B 19/00 |
| 11,012,748 | B2* | 5/2021 | Baughman | H04N 21/4415 |
| 11,176,486 | B2* | 11/2021 | Balasubramanian | G06N 20/20 |
| 11,200,811 | B2* | 12/2021 | Kwatra | G09B 19/24 |
| 11,769,425 | B2* | 9/2023 | Liao | G06F 16/7844 434/156 |
| 11,997,340 | B2* | 5/2024 | Burkitt | H04N 21/2743 |
| 2007/0011012 | A1* | 1/2007 | Yurick | G10L 15/26 704/277 |
| 2009/0049467 | A1* | 2/2009 | Robson | H04N 21/4542 725/28 |
| 2011/0208508 | A1* | 8/2011 | Criddle | G06F 40/216 704/E11.001 |
| 2012/0276504 | A1* | 11/2012 | Chen | G09B 19/06 434/157 |
| 2013/0298180 | A1* | 11/2013 | Mountain | H04N 21/4396 725/151 |
| 2014/0248040 | A1* | 9/2014 | Miller | H04N 5/93 386/285 |
| 2015/0067811 | A1* | 3/2015 | Agnew | H04L 63/0281 726/9 |
| 2016/0335913 | A1* | 11/2016 | Grant | A61B 5/6807 |
| 2018/0139483 | A1* | 5/2018 | Howcroft | H04N 21/8455 |
| 2019/0354887 | A1* | 11/2019 | Subramanian | G06F 16/9024 |
| 2020/0143704 | A1* | 5/2020 | Liao | G10L 15/26 |

OTHER PUBLICATIONS

Wikipedia, "Language and Gender", Available at: "https://en.wikipedia.org/w/index.php?title=Language_and_gender&oldid=847678991" Last downloaded Nov. 1, 2018, 16 pages.

ip.com, "Advanced Language Learning Multimedia extensions", ip.com Disclosure No. IPCOM000140499D, Sep. 2006, 1 page.

* cited by examiner

ENHANCING VIDEO LANGUAGE LEARNING BY PROVIDING CATERED CONTEXT SENSITIVE EXPRESSIONS

BACKGROUND

Technical Field

The present invention generally relates to video processing, and more particularly to expressing video language learning by providing catered context sensitive expressions.

Description of the Related Art

Nowadays, there are many online resources to assist people in learning a language. Of these resources, watching videos/movies/dramas are one of the more popular ones. Most of the time, these videos are subtitled with a translation so that learners can know every word that is uttered in the videos/movies/dramas. Besides improving listening, a learner can repeat the sentences over and over again to memorize them. However, languages are intricate, and different occasions, different audiences and even a speaker's background will result in different speaking styles.

In consideration of the preceding, for people who learn language from videos, it is likely that they will learn some sentences that would sound odd if they use them in real life (ex: for a male Japanese learner, using speech patterns associated with a women is typically deemed inappropriate because it sounds feminine which is likely not the learner's intention). Hence, there is a need for enhancing video language learning.

SUMMARY

According to an aspect of the present invention, a computer processing system is provided for enhancing video-based language learning. The computer processing system includes a video server for storing a plurality of videos that use one or more languages to be learned. The computer processing system further includes a video metadata database for storing translations of sentences uttered in the plurality of videos, character profiles of characters appearing in the plurality of videos, and mappings between the sentences uttered in the plurality of videos and a learner profile. The computer processing system also includes a learner profile database for storing learner profiles of learners of the one or more languages. The computer processing system additionally includes a semantic analyzer and matching engine for finding, for at least a given video from among the plurality of videos and a given learner, alternative sentences for and responsive to the translations of the sentences uttered in the given video that conflict with a respective one of the learner profiles for the given learner. The computer processing system further includes a presentation system for playing back the given video and providing the alternative sentences to the given learner.

According to another aspect of the present invention, a computer-implemented method is provided for enhancing video-based language learning. The method includes storing, by a video server for, a plurality of videos that use one or more languages to be learned. The method further includes storing, by a video metadata database, translations of sentences uttered in the plurality of videos, character profiles of characters appearing in the plurality of videos, and mappings between the sentences uttered in the plurality of videos and a learner profile. The method also includes storing, by a learner profile database, learner profiles of learners of the one or more languages. The method additionally includes finding, by a semantic analyzer and matching engine, for at least a given video from among the plurality of videos and a given learner, alternative sentences for and responsive to the translations of the sentences uttered in the given video that conflict with a respective one of the learner profiles for the given learner. The method further includes playing back, by a presentation system, the given video and providing, by the presentation system, the alternative sentences to the given learner.

According to yet another aspect of the present invention, a computer program product is provided for enhancing video-based language learning. The computer program product includes a non-transitory computer readable storage medium having program instructions embodied therewith. The program instructions are executable by a computer to cause the computer to perform a method. The method includes storing, by a video server for, a plurality of videos that use one or more languages to be learned. The method further includes storing, by a video metadata database, translations of sentences uttered in the plurality of videos, character profiles of characters appearing in the plurality of videos, and mappings between the sentences uttered in the plurality of videos and a learner profile. The method also includes storing, by a learner profile database, learner profiles of learners of the one or more languages. The method additionally includes finding, by a semantic analyzer and matching engine, for at least a given video from among the plurality of videos and a given learner, alternative sentences for and responsive to the translations of the sentences uttered in the given video that conflict with a respective one of the learner profiles for the given learner. The method further includes playing back, by a presentation system, the given video and providing, by the presentation system, the alternative sentences to the given learner.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to expressing video language learning by providing catered context sensitive expressions.

In an embodiment, the present invention provides an approach, which is implementable as a method, a computer program product, and a system, and which can provide personalized language learning experience. In an embodiment the present invention, analyzes video content and cross-referencing a view's profile in order to inform the learner which sentences are safe to use and which sentences are inappropriate (or impolite), considering the learner's attributes. In an embodiment, if the current subtitles are not appropriate for the learner to speak, the system can look up alternative sentences and also provide clips which demonstrate how the alternative sentences are used in conversation.

Hence, in an embodiment, the present invention can provide a personalized and context-aware language learning experience.

Figure 1:
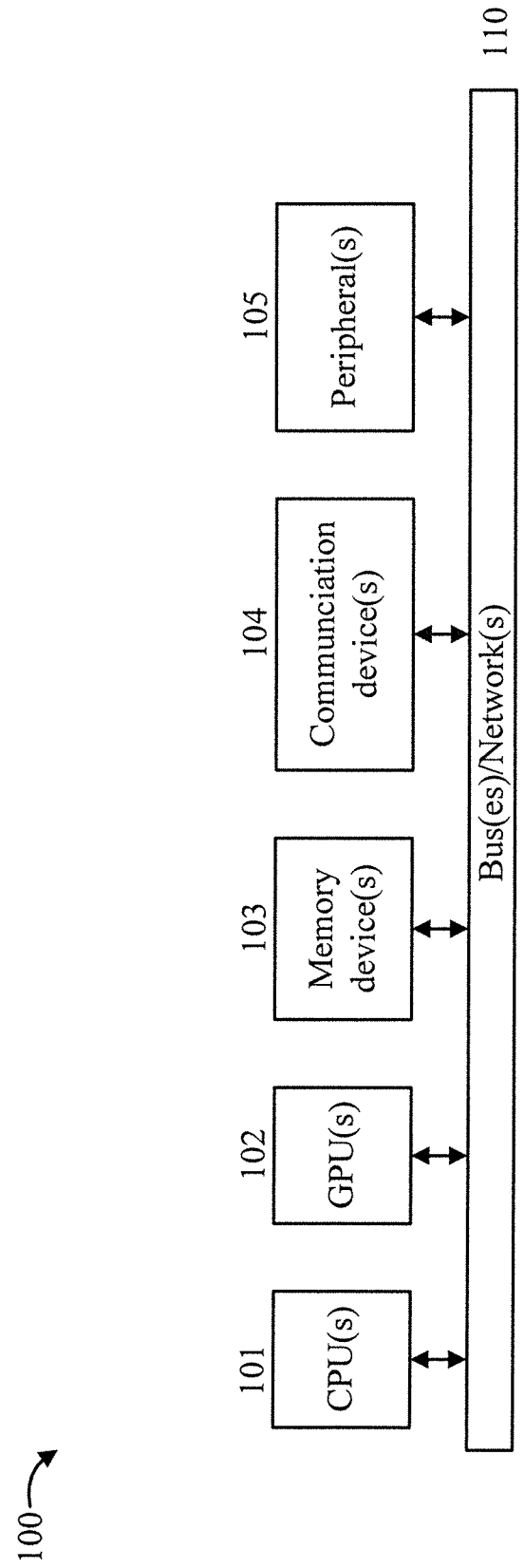
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
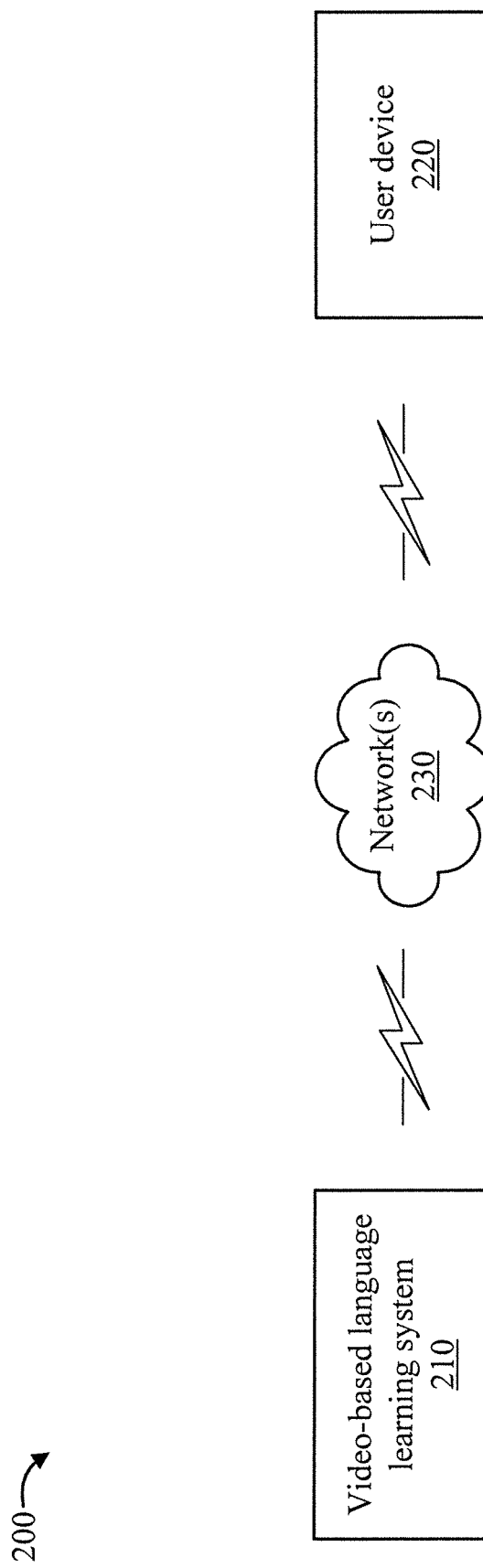
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a video-based language learning system 210 and a user device 220. The video-based language learning system 210 and the user device 220 are configured to enable communications therebetween. For example, transceivers and/or other types of communication devices including wireless, wired, and combinations thereof can be used. In an embodiment, communication between the video-based language learning system 210 and the user device 220 can be performed over one or more networks, collectively denoted by the figure reference numeral 230. The communication can include, but is not limited to, a language selection or movie selection from the user device 220, and a movie(s) in a foreign language(s) from the video-based language learning system 210. The user device 220 can be any type of processor-based system such as, for example, but not limited to, a smart phone, a smart television, a tablet, a laptop, a media presentation device, and so forth.

In an embodiment, the video-based language learning system 210 can be implemented as a node in a cloud-computing arrangement. These and other configurations of the elements of environment 200 are readily determined by one of ordinary skill in the art given the teachings of the present invention provided herein, while maintaining the spirit of the present invention.

Figure 3:
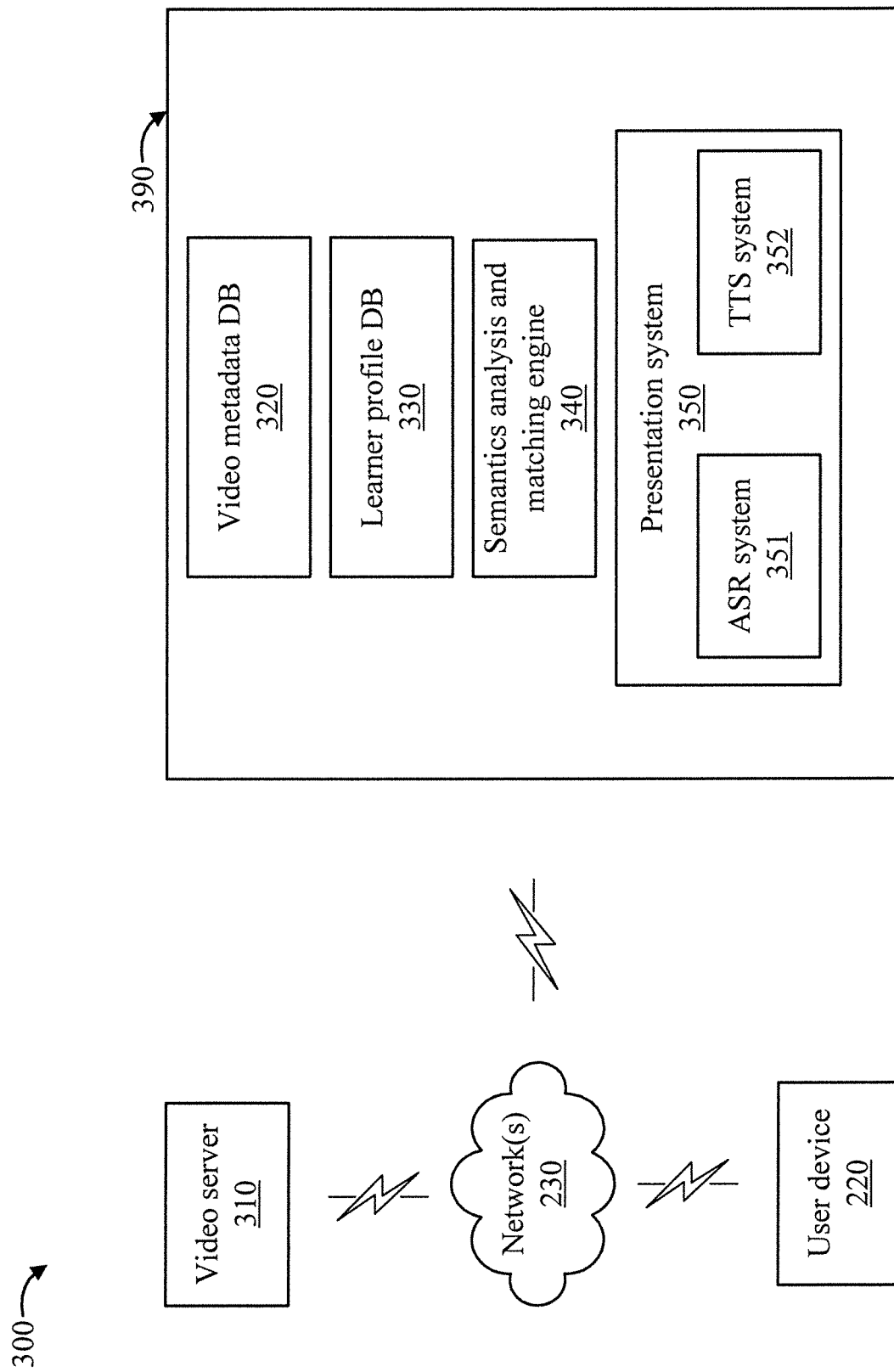
FIG. 3 is a block diagram showing an exemplary system for enhancing video language learning by providing catered context sensitive expressions, in accordance with an embodiment of the present invention.

FIG. 3 is a block diagram showing an exemplary system 300 for enhancing video language learning by providing catered context sensitive expressions, in accordance with an embodiment of the present invention.

The system 300 includes a video server 310, a video metadata database (DB) 320, a learner profile DB 330, a semantics analysis and matching engine 340, and a presentation system 350.

An exemplary configuration of the elements of system 300 will now be described. However, it is to be appreciated that other configurations can also be used, while maintaining the spirit of the present invention. In an embodiment, the video server 310 is implemented as a remote server 310 accessible by a user device 220 over a network(s) 210. A management server 390 includes the video metadata DB 320, the learner profile DB 330, the semantics analysis and matching engine 340. The presentation system 350 can be implemented in the management server 390, the user device 220, or have portions in each of the management server 390 and the user device 220. In an embodiment, the user interface of the user device can be used, while what is displayed and so forth it first generated by the presentation system 350 at a management server 390 side, and then sent to the user device 220 for reproduction visually and/or audibly. Hence, the presentation system 350 can be implemented by the management server 390, with data (alternative sentences and supporting video clips) sent to the user device 220, or parts of the presentation system 350 can be implemented by the user device 220, depending upon the implementation. These and other variations of the present invention are readily contemplated by one of ordinary skill in the art given the teachings of the present invention provided herein, while maintaining the spirit of the present invention.

The video server 310 stores various foreign language movies from which a user can learn the foreign language. In an embodiment, the video server 310 includes movies from various foreign languages so that a user can select from a set of multiple languages in order to see movies using a language corresponding to the user's selection.

The video metadata DB 320 includes a translation of video captions. The video metadata DB 320 further includes basic profiles of the characters shown in the video (e.g., gender, age range, etc.). The video metadata DB 320 also includes a mapping between a sentence and its speaker profile.

The learner DB 330 includes profile information relating to a learner of one or more of the languages used by the videos stored in the video server 210. The learner's profile is compared to social variables (e.g., including, but not limited to, gender, age, ethnicity, religion, status, level of education, etc.) in the video metadata from the video metadata DB 320. In an embodiment, the learner's profile and profiles of the characters shown in the video in order to match gender, ages, and scenarios between the learner and video.

The semantics analysis and matching engine 340 can analyze attributes of the sentences in the movies. Some of the sentences might be used by people with specific attributes only (e.g., gendered language). If the attributes of the sentence conflict with the attributes of the current learner, then the semantics analysis and matching engine 340 can look up alternative sentences for the learner.

The presentation system 350 is configured to present catered context sensitive expressions to a user. For example, in an embodiment, the presentation system 350 can show highlights of sentences which conflict with the user profile. The presentation system 350 can provide a list of alternative sentences for sentences which conflict with the user profile. The presentation system 350 can provide links to other video clips for the alternative sentences, which can further explain the usage of the alternative sentences. The presentation system 350 can include a display, one or more speakers, a user input device (mouse, keyboard, capacitive display as the display, and so forth), and specialized code (stored in RAM, or even an ASIC) for implementing a highlighting scheme as described herein. In an embodiment, the presentation system 350 includes a Text-To-Speech (TTS) system 351 for transforming the textual sentence translations into acoustic utterances representative of the textual sentence translations. In an embodiment, the presentation system 350 includes an Automatic Speech Recognition (ASR) system 352 for converting uttered speech from the video clips into textual sentence translations. It is to be appreciated that the ASR can be configured to perform language conversion from an acoustic utterance in a first language to a textual representation of the acoustic utterance in a second language.

When the system receives a new video, the system 300 is configured to perform the following:
(i) The system 300 will label all the sentences with social context sensitivity attributes (such as gender, age, ethnicity, religion, status, level of education, etc.), and save the labels in the metadata DB 320.
(ii) The system 300 will save translations of the captions in the metadata DB 320.

When a learner watches the video, the system 300 is configured to perform the following: When the system 300 loads a sentence, the semantics analytics and matching engine 340 will start a "matching" between the learner's profile and the social variables of that particular sentence. If attributes of the sentence conflict with the learner's attributes (e.g., gender, age range, etc.), the system (e.g., the presentation system 350) will highlight the sentences and will look up alternative sentences.

Besides providing alternative sentences, the presentation module 350 can also provide clips which demonstrate how the alternative sentences are used in conversation. These alternative sentences and clips will be sorted based on the matching level with the language learner's profile in the learner profile DB 330.

In an embodiment, the present invention can analyze the characters appearing in the video. The characteristics (such as gender, age, ethnicity, religion, status, level of education, etc.) of the characters appearing in the video can be saved into separate character profiles. These character profiles can be linked with sentences spoken by that character.

In an embodiment, the present invention can use a coloring scheme to highlight sentences. For example, if there is a clear mismatch (e.g. the usage is mainly for female but the user is a man), the system 300, e.g., presentation system 350) will display the highlight in an emphasized color, say red, showing a warning. If the system 300 does not have enough confidence on whether or not the usage matches the user's background (e.g., the usage is for a junior (young) person to talk with a senior person, but the learner is a middle-aged person), the system 300 will highlight it with another color, say yellow, to remind the learner to check more. Also, if a perfect match is found, a green color might be used. These and other variations, such as other highlighting schemes and/or variations on the preceding scheme, are readily determined by one of ordinary skill in the art given the teachings of the present invention provided herein, while maintaining the spirit of the present invention.

A description will now be given regarding how to find alternative sentences: The system 300 will analyze the semantic meaning of the sentence through second language translation which is already available in the database. Referencing a second language translation, the system can eliminate biases caused by context. For matching alternative sentences, the system 300 can sort the matching alternative sentences based on the matching level to the learner's profile.

It is to be noted that the present invention allows the user to check up each usage since there could be more than one usages that are suitable for the user, depending on the scenario of a real conversation. Hence, in an embodiment, the proposed system is not necessarily making a decision for the user, but is instead providing more information for the user's awareness and reference. These and other attendant advantages of the present invention are readily determined by one of ordinary skill in the art given the teachings of the present invention provided herein, while maintaining the spirit of the present invention.

Figure 4:
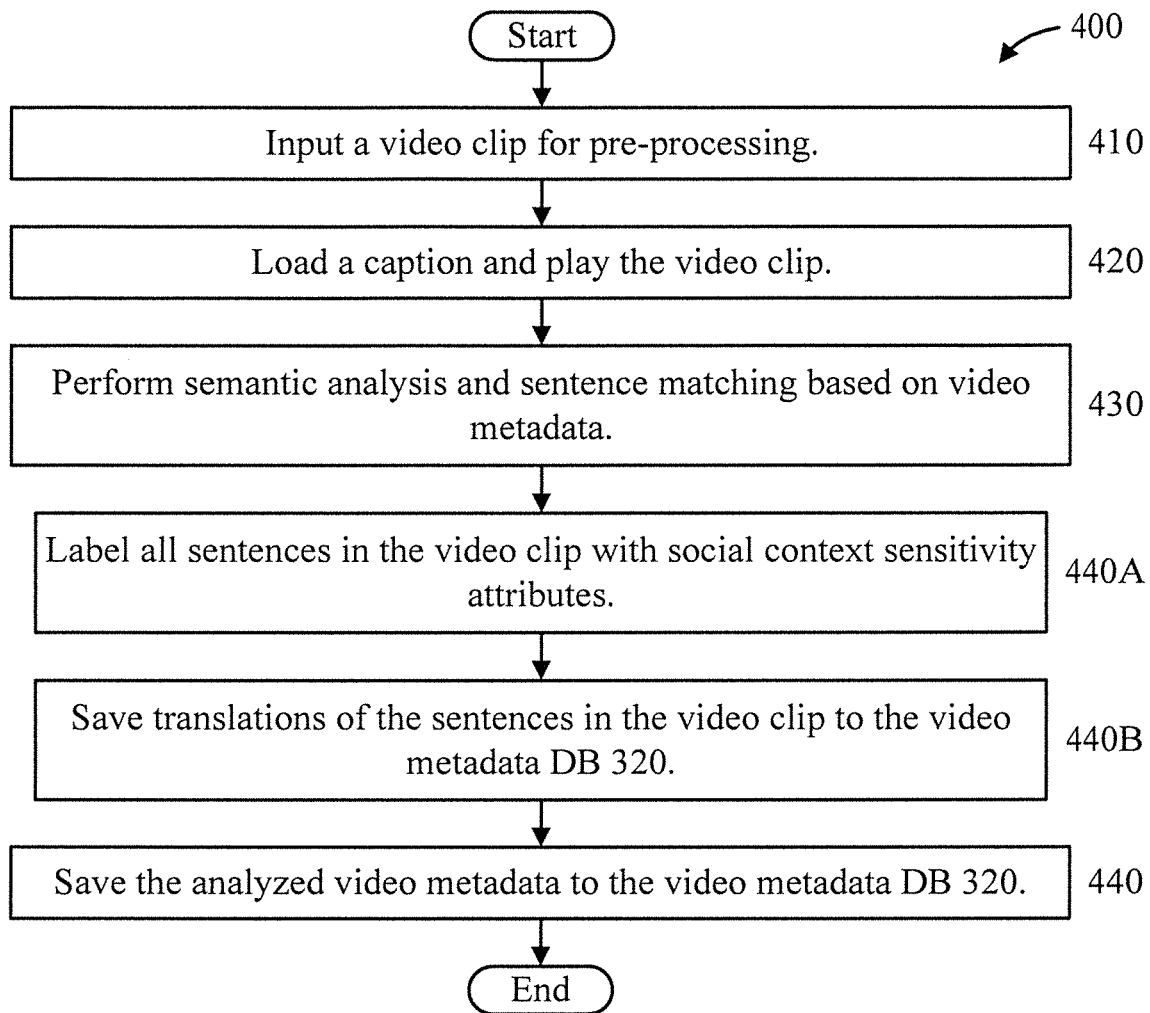
FIG. 4 is a flow diagram showing an exemplary method for pre-processing videos, in accordance with an embodiment of the present invention.

FIG. 4 is a flow diagram showing an exemplary method 400 for pre-processing videos, in accordance with an embodiment of the present invention.

At block 410, input a video clip for pre-processing.

At block 420, load a caption and play the video clip.

At block 430, perform semantic analysis and sentence matching based on video metadata.

In an embodiment, block 430 can include one or more of blocks 430A and 430B.

At block 430A, label all sentences in the video clip with social context sensitivity attributes. Such social context sensitivity attributes can include, but are not limited to, gender, age, ethnicity, religion, status, level of education, and so forth. It is to be appreciated that the preceding social context sensitivity attributes are merely illustrative and, thus, other social context sensitivity attributes can also be used, while maintaining the spirit of the present invention.

At block 430B, save translations of the sentences in the video clip to the video metadata DB 320.

At block 440, save the analyzed video metadata to the video metadata DB 320.

Figure 5:
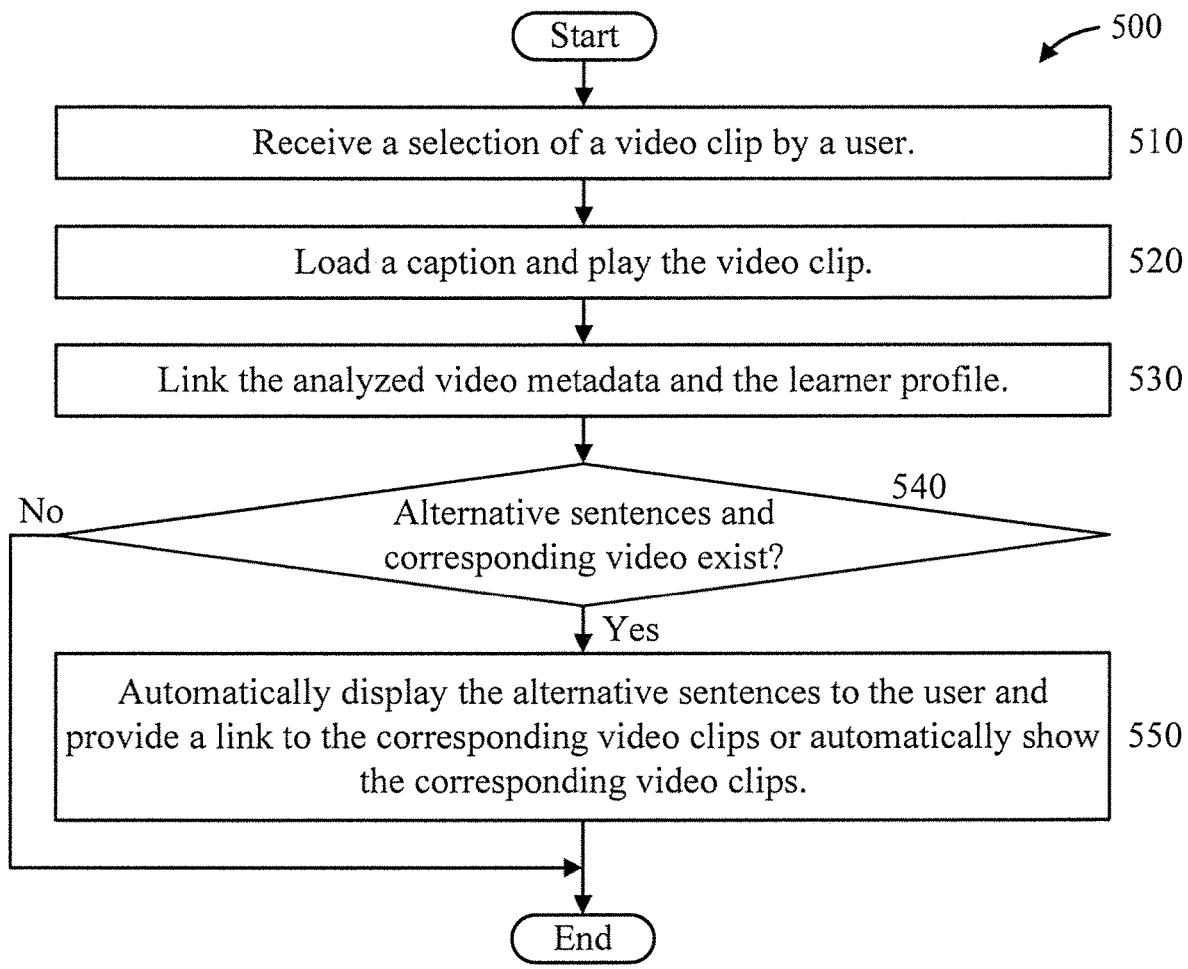
FIG. 5 is a flow diagram showing an exemplary method for enhanced video language learning, in accordance with an embodiment of the present invention.

FIG. 5 is a flow diagram showing an exemplary method 500 for enhanced video language learning, in accordance with an embodiment of the present invention.

At block 510, receive a selection of a video clip by a user.

At block 520, load a caption and play the video clip.

At block 530, link the analyzed video metadata and the learner profile.

At block 540, determine whether or not any alternative sentences and corresponding video clips exist. If so, the proceed to block 550. Otherwise, terminate the method. As used herein, the corresponding video clips demonstrate how the alternative sentences are used in conversation.

At block 550, automatically display the alternative sentences to the user and provide a link to the corresponding video clips. In an embodiment, the corresponding video clips are also automatically displayed to the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
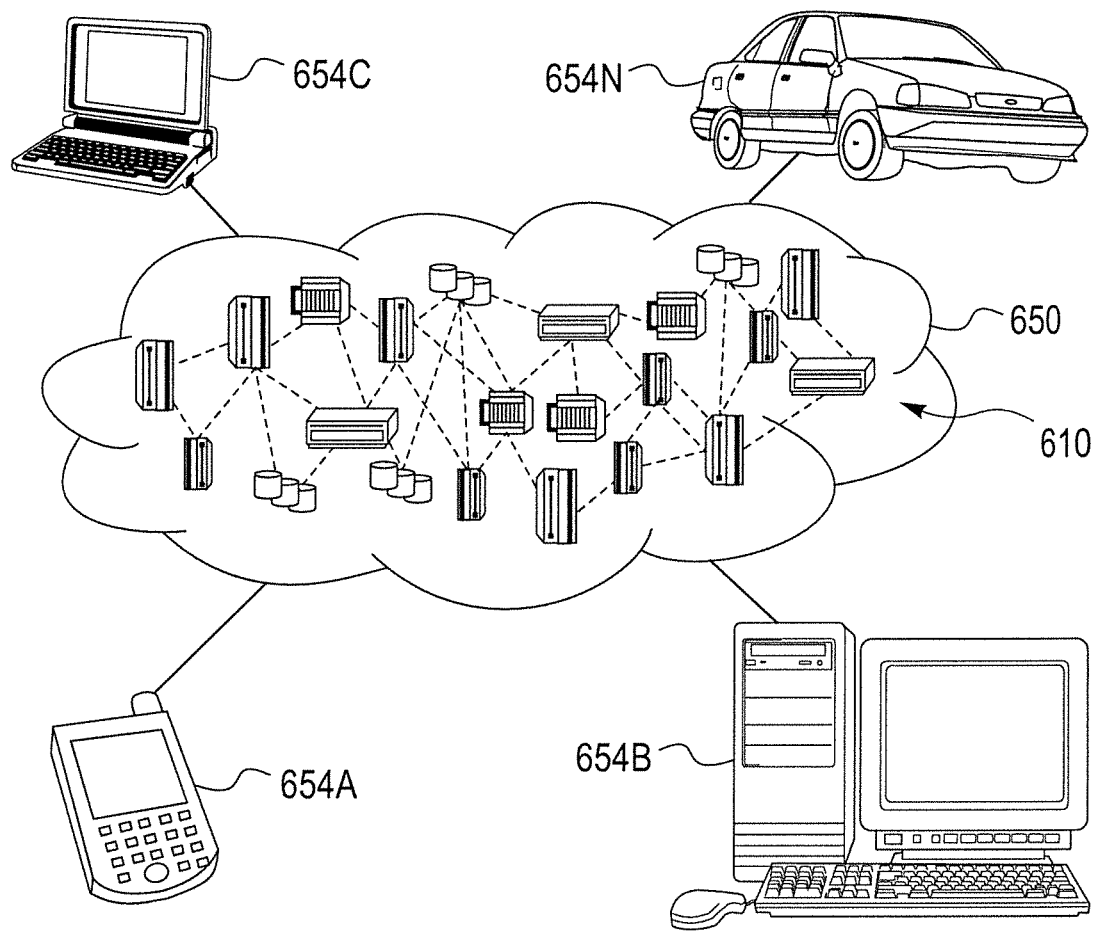
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
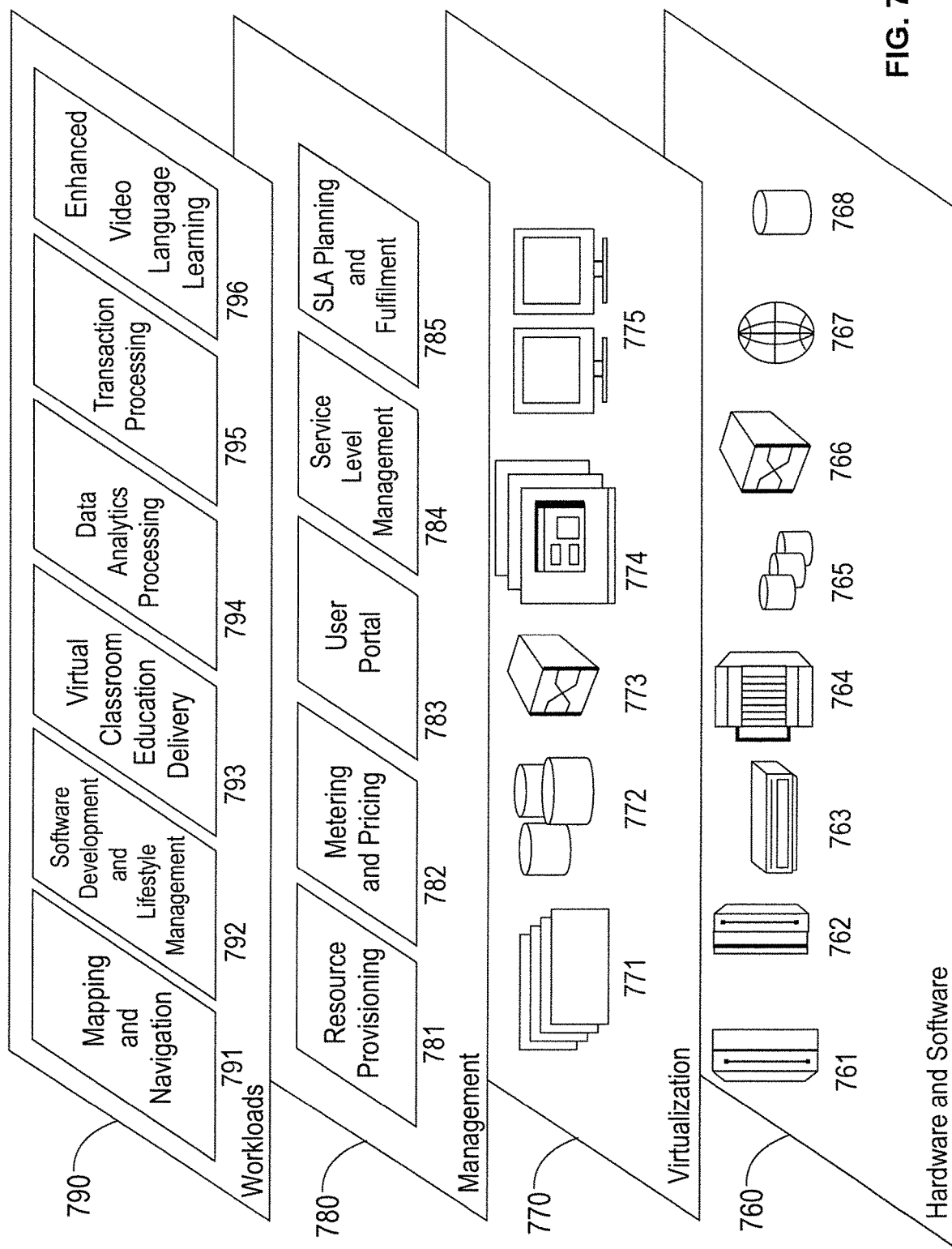
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; enhanced video language learning by providing catered context sensitive expressions 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer processing system for enhancing video-based language learning, comprising:
    a semantic analyzer and matching engine that finds, for at least a given video from among a plurality of videos and a given learner, alternative sentences for and responsive to translations of the sentences uttered in the given video that conflict with a respective one of social information in learner profiles stored in a learner profile database for the given learner; and
    a presentation system on a user device for playing back the given video and providing to the given learner with inappropriate sentences together with appropriate sentences for replacing the inappropriate sentences, the inappropriate sentences in a form of the translations of the sentences uttered in the given video that conflict with the respective one of the social information, and the appropriate sentences in a form of the translations thereof.

2. The computer processing system of claim 1, further comprising an automatic speech recognition system for transforming acoustic utterances of the alternative sentences into textual representations of the acoustic utterances, and wherein the presentation system presents the textual representations to the given learner.

3. The computer processing system of claim 1, wherein the alternative sentences are highlighted using a role association matching technique to provide role association matching.

4. The computer processing system of claim 3, wherein the role association matching relates to a gender role.

5. The computer processing system of claim 1, wherein the semantic analyzer and the matching engine identifies links, provided to a user by the presentation system, to other videos that correspond to the alternative sentences to support learning from the alternative sentences.

6. The computer processing system of claim 5, wherein the other videos explain a proper usage of the alternative sentences.

7. The computer processing system of claim 1, wherein the semantic analyzer and matching engine analyzes a semantic meaning of sentences uttered in the plurality of videos to identify and eliminate context bias in the alternative sentences.

8. The computer processing system of claim 1, wherein the alternate sentences are sorted for presentation to a user based on a matching level relative to the respective one of the learner profiles for the given learner.

9. The computer processing system of claim 1, wherein the semantic analyzer and matching engine determines the conflict based on attributes of a given user that are specified in the respective one of the learner profiles for the given learner relative to attributes of the translations of the sentences uttered in the plurality of videos.

10. The computer processing system of claim 1, further comprising a video server configured to store a plurality of videos including audio that use one or more languages to be learned, the video server being implemented using a cloud-based configuration.

11. A computer-implemented method for enhancing video-based language learning, comprising:

finding, by a semantic analyzer and matching engine, for at least a given video from among a plurality of videos and a given learner, alternative sentences for and responsive to translations of sentences uttered in a given video that conflict with a respective one of social information in learner profiles for the given learner; and playing back, by a presentation system, the given video and providing, by the presentation system to the given learner, inappropriate sentences together with appropriate sentences for replacing the inappropriate sentences, the inappropriate sentences in a form of the translations of the sentences uttered in the given video that conflict with the respective one of the social information, and the appropriate sentences in a form of the translations thereof.

12. The computer-implemented method of claim 11, further comprising transforming, by an automatic speech recognition system, acoustic utterances of the alternative sentences into textual representations of the acoustic utterances, and wherein the presentation system presents the textual representations to the given learner.

13. The computer-implemented method of claim 11, wherein the alternative sentences are highlighted using a role association matching technique to provide role association matching.

14. The computer-implemented method of claim 13, wherein the role association matching relates to a gender role.

15. The computer-implemented method of claim 11, further comprising identifying, by the semantic analyzer and matching engine, links, provided to a user by the presentation system, to other videos that correspond to the alternative sentences to support learning from the alternative sentences.

16. The computer-implemented method of claim 15, wherein the other videos explain a proper usage of the alternative sentences.

17. The computer-implemented method of claim 11, further comprising analyzing, by the semantic analyzer and matching engine, a semantic meaning of sentences uttered in the plurality of videos to identify and eliminate context bias in the alternative sentences.

18. The computer-implemented method of claim 11, wherein the alternate sentences are sorted for presentation to a user based on a matching level relative to the respective one of the learner profiles for the given learner.

19. The computer-implemented method of claim 11, wherein the conflict is determined based on attributes of a given user that are specified in the respective one of the learner profiles for the given learner relative to attributes of the translations of the sentences uttered in the plurality of videos.

20. A computer program product for enhancing video-based language learning, the computer program product comprising a non-transitory computer readable storage medium having program instructions embodied therewith, the program instructions executable by a computer to cause the computer to perform a method comprising:

finding, by a semantic analyzer and matching engine, for at least a given video from among a plurality of videos and a given learner, alternative sentences for and responsive to translations of sentences uttered in a given video that conflict with a respective one of social information in learner profiles for the given learner; and playing back, by a presentation system, the given video and providing, by the presentation system, to the given learner, inappropriate sentences together with appropriate sentences for replacing the inappropriate sentences, the inappropriate sentences in a form of the translations of the sentences uttered in the given video that conflict with the respective one of the social information, and the appropriate sentences in a form of the translations thereof.

* * * * *